Figure 1:
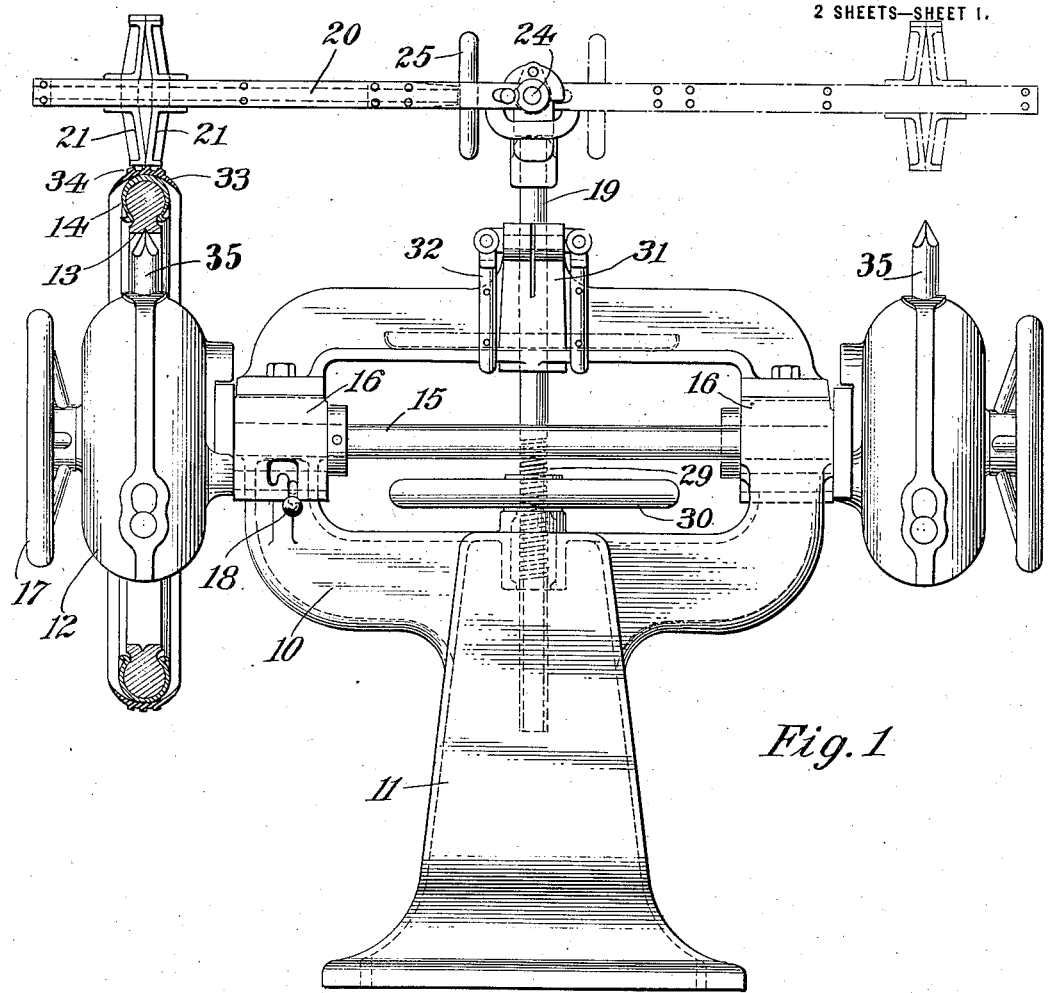

H. J. HOYT.
APPARATUS FOR CENTRALIZING THE TREAD UPON THE CARCASS OF A TIRE.
APPLICATION FILED MAR. 22, 1915.

1,162,360.

Patented Nov. 30, 1915.
2 SHEETS—SHEET 1.

Witnesses:
S. G. Taylor
Francis Boyle

Inventor
Homer J. Hoyt,
By his Attorney
Ernest Hopkinson

H. J. HOYT.
APPARATUS FOR CENTRALIZING THE TREAD UPON THE CARCASS OF A TIRE.
APPLICATION FILED MAR. 22, 1915.
1,162,360.
Patented Nov. 30, 1915.
2 SHEETS—SHEET 2.
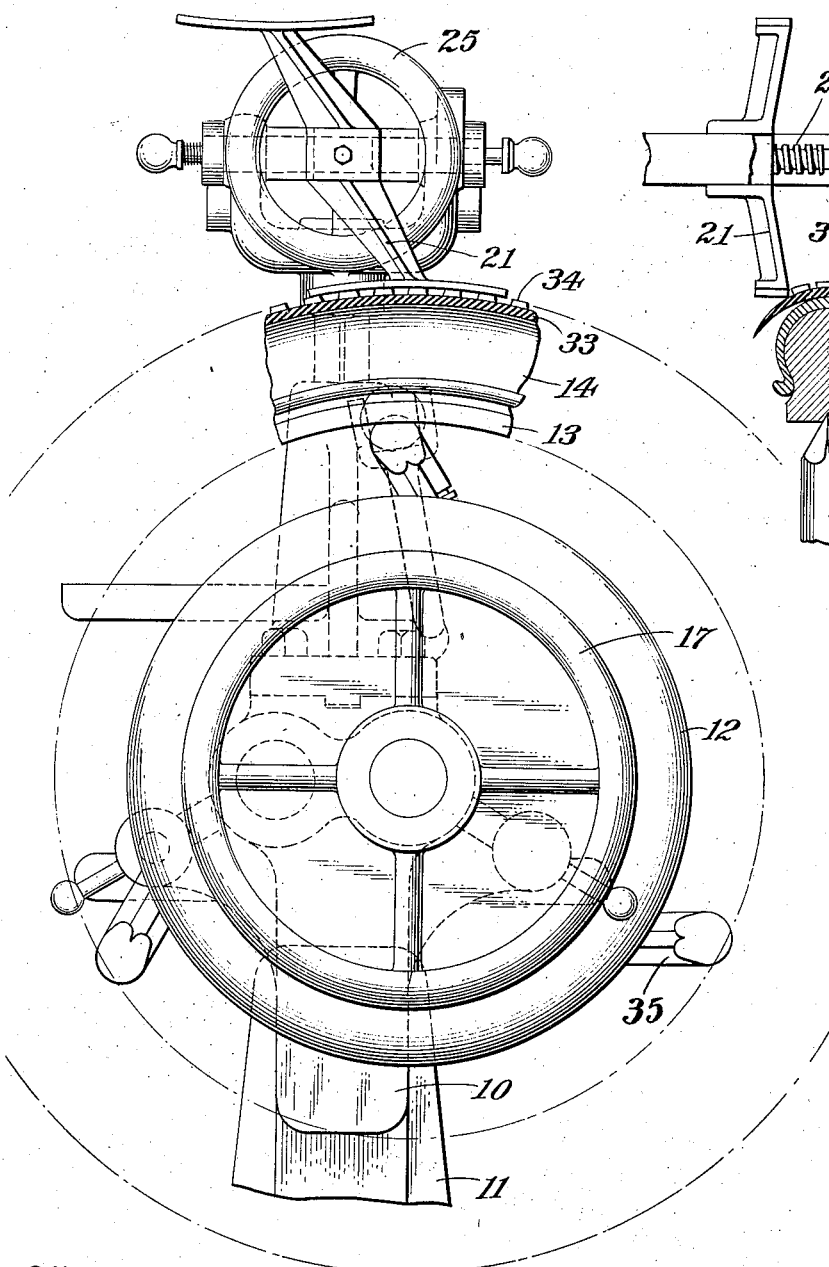
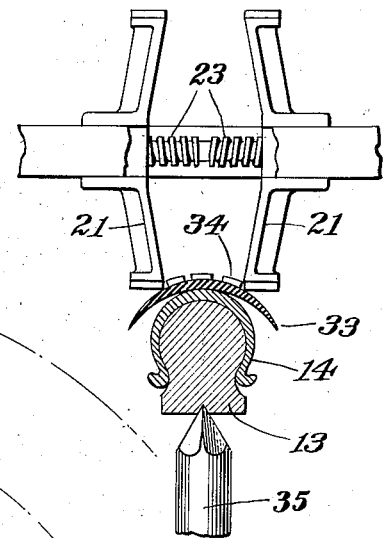
Witnesses:
Inventor
Homer J. Hoyt,
By his Attorney

UNITED STATES PATENT OFFICE.

HOMER J. HOYT, OF DETROIT, MICHIGAN, ASSIGNOR TO MORGAN & WRIGHT, A CORPORATION OF MICHIGAN.

APPARATUS FOR CENTRALIZING THE TREAD UPON THE CARCASS OF A TIRE.

1,162,360. Specification of Letters Patent. Patented Nov. 30, 1915.

Application filed March 22, 1915. Serial No. 16,024.

*To all whom it may concern:*

Be it known that I, HOMER J. HOYT, a citizen of the United States, residing at Detroit, in the county of Wayne and State of Michigan, have invented certain new and useful Improvements in Apparatus for Centralizing the Tread Upon the Carcass of a Tire, of which the following is a full, clear, and exact description.

This invention relates to tire building machines and has for an object to provide an apparatus having novel means for positively moving the tread of a tire until it becomes perfectly centralized upon the tire carcass.

In the manufacture of tires, more particularly that type known as anti-skid tires wherein are embodied embossed ribs, knobs, and other circumferentially extending projections, it is customary to build the tire carcass of successive plies of rubber treated fabric wound upon a ring core. The surface of the completed carcass is then roughened and supplied with a coating of cement. The heavy rubber embossed tread which is built independently of the carcass, and then usually partially vulcanized, is applied in the nature of a cylinder to the carcass.

Ordinarily a round of fabric is interpolated between the cemented surface of the carcass and the heavy adhesive rubber tread to prevent these parts from sticking together while the operator pulls and shoves the tread across the carcass until it becomes centralized or at least centralized as far as the eye can determine. Said round of fabric is then removed and the operator hammers the tread into intimate contact with the carcass. It is essential during this assembling of the parts that the operator get the tread perfectly centralized on the carcass otherwise the tire will be built unsymmetrical and during vulcanization will take a permanent set in this unsymmetrical condition.

To obviate the above described manual operation of centralizing the tread upon the carcass and to insure of the tread being more perfectly centralized upon the carcass than hitherto possible, I provide an apparatus embodying essentially a pair of jaws which are positioned to operate on the circumferential anti-skid projections, and means to rotate the tire in a path between the jaws, the latter serving to shift the tread bodily during such rotation of the tire until it becomes perfectly centralized throughout on the carcass.

The invention will be readily understood from the following description taken in connection with the accompanying drawings in which—

Figure 3:
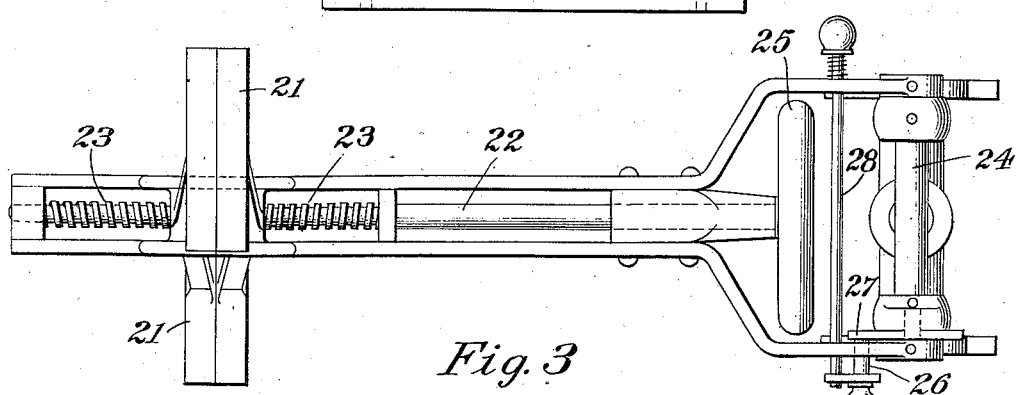

Figure 1 is a front elevation of the apparatus with a part in section; Fig. 2 is a fragmentary side elevation with a part in section; Fig. 3 is an enlarged plan view showing the adjustment for the jaws; Fig. 4 is an enlarged front elevation showing the jaws in operative position.

Referring now to the drawings the apparatus is shown to comprise a frame 10, which is supported upon a suitable pedestal 11, and carries a spider 12 of a well known type used for supporting a ring core 13 upon which a tire carcass 14 is built. The spider is mounted upon a shaft 15 which is journaled in bearings 16 on the frame. The hand wheel 17 is rotatably fixed to the spider for expanding or contracting the prongs 35 when the spider is locked to the frame by the usual bolt lock 18. Upon release of the lock the spider may be turned at will in either direction. The spider mechanism is duplicated on each side of the machine thus permitting of the application and removal of a tire on one side of the machine while the operator is working upon a tire on the other side of the machine.

The centralizing mechanism comprises a standard 19 centrally disposed on the frame 10, and pivoted to the upper end of the standard is an arm 20 which carries at its outer end a pair of jaws 21 that overhang the spider and extend respectively on either side of the central plane of the latter. The jaws are movable toward and away from each other simultaneously to receive therebetween various dimensions of anti-skid projections as will presently appear, this movement of the jaws being effected by a screw 22 carried by the arm 20 and formed with right and left-hand threads 23 which pass through correspondingly threaded hubs of respective jaws 21. The arm 20 is forked at the inner end and there secured to a pivot pin 24 carried by the standard 19, the branches of the fork housing the hand wheel 25 of the adjusting screw 22. For locking the arm in operative position a pin 26 is engaged through one of the branches of the fork and engages a stationary portion 27 of the standard 19, the pin being normally held in active position by a spring-pressed rod 28.

As best shown in Figs. 2 and 4 the jaws 21 are duplicated above and below the arm 20 and these duplicate sets offset respectively on opposite sides of the vertical to promote proper engagement with the tread when the arm 20 is thrown into operative position upon either side of the machine.

To facilitate the jaws being adjusted vertically to operate upon various sizes of tires, the standard 19 is threaded as shown at 29 and equipped with a threaded hand wheel 30 of the usual and well known kind by means of which the standard may be raised or lowered without rotation of the standard. To lock the standard in adjusted position it is passed near the upper end through a split bearing 31 on the frame, the halves of the bearing being forced to pinch the standard and lock it stationary by means of cam levers 32 of the usual and well known kind.

In operation a core with a carcass built thereon is mounted on one of the spiders 12. The heavy rubber embossed tread 33 is then slipped in the nature of a cylinder upon the carcass with an intervening layer of fabric (not shown) between the tread and carcass. The arm 20 is then rocked over to dispose the jaws 21 in the path of the tire, it being understood that the jaws prior to this have been spread apart to receive therebetween the circumferentially extending anti-skid projections 34 of the tread. The screw 22 is then rotated to adjust the jaws to bear lightly upon the outer sides of the projections. The tire is then rotated through the instrumentality of the hand wheel 17 or otherwise, and during such rotation the jaws will contact with the outer sides of the projections 34 and shove the carcass transversely of the tire until it becomes perfectly centralized. The interposed layer of fabric between the carcass and tread may now be withdrawn by pulling the free end thereof from underneath that portion of the tread directly under the jaws, the latter holding the tread against displacement during such withdrawal of the fabric. The tread now rests upon the cemented surface of the carcass and to complete the assembling the tread is hammered manually upon the carcass after which the tire is vulcanized.

Having described my invention, what I claim and desire to have protected by Letters Patent is:

1. A device for centralizing a loose tread upon the carcass of a tire, embodying a ring core for supporting the tire, and a pair of jaws for engaging the tread and shifting the same transversely of the carcass into centralized position thereupon.

2. A device for centralizing a loose tread upon the carcass of a tire, embodying a ring core for supporting the tire, jaws for engaging and shifting the tread into centralized position on the carcass, and means for adjusting the jaws to operative position with respect to the tire.

3. A device for centralizing a loose tread upon the carcass of a tire, embodying a ring core for supporting the tire, jaws for engaging and centralizing the tread upon the carcass, and means for rotating the core to advance the tire in a path between the jaws.

4. A device for centralizing a loose tread upon the carcass of a tire, embodying a ring core for supporting the tire, jaws for engaging and centralizing the tread upon the carcass, said jaws being positioned on opposite sides of and being equally spaced from the central plane of the core, and means for rotating the core for advancing the tire in a path between the jaws.

5. A device for centralizing a loose tread upon the carcass of a tire, embodying a ring core for supporting the tire, means for rotating the ring core, jaws for engaging and centralizing the tread upon the carcass, said jaws being disposed on opposite sides of and equally spaced from the central plane of the core, and means for adjusting the jaws radially with respect to the core.

6. A device for centralizing a loose tread upon the carcass of a tire, embodying a ring core for supporting the tire, means for rotating the core, jaws for engaging and centralizing the tread upon the carcass, means for adjusting the jaws toward and away from each other, and means for adjusting the jaws radially with respect to the core.

Signed at Detroit, Mich., this 15th day of March 1915.

HOMER J. HOYT.

Witnesses:
JOHN CARLSON,
E. LA BUSCHEWSKY.